United States Patent
Whitfield, Jr.

(10) Patent No.: US 9,775,468 B2
(45) Date of Patent: Oct. 3, 2017

(54) DEVICE FOR COOKING FOOD ON A GRILL

(71) Applicant: Charlie Adron Whitfield, Jr., Holcomb, MS (US)

(72) Inventor: Charlie Adron Whitfield, Jr., Holcomb, MS (US)

( * ) Notice: Subject to any disclaimer, the term of this patent is extended or adjusted under 35 U.S.C. 154(b) by 213 days.

(21) Appl. No.: 13/925,175

(22) Filed: Jun. 24, 2013

(65) Prior Publication Data

US 2014/0373732 A1    Dec. 25, 2014

(51) Int. Cl.
*A47J 37/04* (2006.01)
*A47J 43/18* (2006.01)

(52) U.S. Cl.
CPC ..................................... *A47J 43/18* (2013.01)

(58) Field of Classification Search
CPC .... A47J 37/0694; A47J 37/043; A47J 37/041; A47J 36/20; A47J 27/04; A47J 39/00
USPC .......... 99/419, 403, 413, 421 V, 448, 421 A, 99/421 H
See application file for complete search history.

(56) References Cited

U.S. PATENT DOCUMENTS

| | | | | |
|---|---|---|---|---|
| 2,622,506 A | * | 12/1952 | Finizie | A47J 37/043 126/338 |
| 3,053,169 A | * | 9/1962 | Rappaport | 99/421 R |
| 4,589,333 A | * | 5/1986 | Murphy | A47J 37/0688 99/419 |
| D286,256 S | * | 10/1986 | Jung | D7/334 |
| 4,887,523 A | * | 12/1989 | Murphy et al. | 99/419 |
| 4,896,011 A | * | 1/1990 | Trucks | 219/725 |
| 4,982,657 A | * | 1/1991 | Ghenic | 99/421 A |
| 5,154,116 A | * | 10/1992 | Dube | 99/403 |
| 5,797,312 A | * | 8/1998 | Brant | 99/415 |
| 5,826,497 A | * | 10/1998 | Basso | 99/446 |
| 5,845,563 A | * | 12/1998 | Haring | A47J 37/043 99/419 |
| D409,047 S | * | 5/1999 | Battioli | D7/402 |
| 6,047,633 A | * | 4/2000 | Khaytman | A47J 37/049 99/419 |
| 6,640,797 B1 | * | 11/2003 | Magers | 126/30 |
| 6,837,149 B1 | * | 1/2005 | Tsontakis | A47J 37/046 99/339 |
| 7,107,898 B2 | * | 9/2006 | Sculuca | 99/421 A |
| 8,110,237 B2 | * | 2/2012 | Smith | 426/523 |
| 2003/0051607 A1 | * | 3/2003 | Cassell et al. | 99/419 |
| 2008/0053425 A1 | * | 3/2008 | Stuhlmacher | A47J 37/0786 126/30 |
| 2014/0377431 A1 | * | 12/2014 | Kazerouni | A47J 37/043 426/523 |

* cited by examiner

*Primary Examiner* — Dana Ross
*Assistant Examiner* — Joseph Iskra

(57) ABSTRACT

The device comprises a square metal base plate with an anchor post, a tine holder that fits over the base plate anchor post, and a plurality shaped tines of circular cross-section that are inserted into the tine holder. The shaped tines are inserted into the food to be cooked. A plurality of tines are inserted into a hole on the tine holder. The tine holder assembly is then set atop the anchor post on the base plate such that the food is positioned vertically. The device is then placed directly on top of the upper grill surface.

10 Claims, 4 Drawing Sheets

DEVICE FOR COOKING FOOD ON A GRILL

BACKGROUND OF THE INVENTION

This invention relates to devices which support food to aid in the cooking process. More specifically, the invention allows food to be positioned relative to the cooking heat source such that adverse effects, such as charring and uneven heating, are avoided.

In U.S. Pat. No. 4,982,657, Ghenic presents a hotdog roaster comprised of a manually controlled, rotating assembly for three hotdogs. This device is placed atop a grill during operation. The device has balancing mechanisms that maintain the device in a stabilized condition on the grilled surface in spite of cantilever forces imposed by the supported hot dogs. An elongated handle is rotatably attached to a housing that mounts a number of rotary hot dog grippers. A gear mechanism within the housing transmits a drive force from the handle to the hot dog grippers.

In U.S. Pat. No. 5,826,497, Basso discloses a device for cooking meat and a means of supporting the meat during cooking. The oils and juices liberated during the cooking are captured. It has one vertically disposed hollow column with multiple perforations. The column has a base which can be connected to a rotating mechanism. One plate attached to the column has two fastening bushings with perforations. These allow passage of oils and juices collected by the plate into the hollow column and through the interior of the column to be discharged. The plates are slightly concave and have hooks for suspending the meat to be roasted on the bottom side of the plates.

U.S. Pat. No. 8,110,237, Smith discloses a device for cooking hollow foods having a plurality of skewers supporting the food item be piercing the wall through a stem side of the food item. The skewers maintain the orientation of the food item with the stem side facing down and maintaining a minimum volume of the interior chamber to facilitate the accumulation of steam within the interior chamber.

In U.S. Pat. No. 5,797,312, Brant discloses an array of tines for cooking elongated foods, such as hotdogs in a microwave. This assembly has a lid, a base and a tray. The food is placed on the tray which is then placed on the base. The base contains a steam producing liquid at a level below the bottom of the tray. The lid placed on the base covering the tray and food. The assembly is then placed in a microwave. As the liquid is heated, steam passes through the tray, through apertures, over the food and out the lid.

In Design Pat. No. 409,047, Battioli shows a rotisserie spit that has a turnable handle connected to a circular plate with tines extending from each face of the plate. Presumably foods, such as hotdogs, are skewered on each of the tines and the device is rotated during the cooking process.

SUMMARY OF THE INVENTION

The device comprises a square metal base plate with an anchor post, a tine holder that fits over the base plate anchor post, and a plurality shaped tines of circular cross-section that are inserted into the tine holder. In one method of use of the invention, the shaped tines are inserted into the food to be cooked. Then, one end of each of the food-tine assemblies is inserted into a hole on the tine holder. Once a plurality of tines with food has been inserted into the tine holder, the tine holder is then set atop the anchor post on the base plate such that the food is positioned vertically. The assembled apparatus is then placed directly on top of the upper grill surface of a typical outdoor cooking grill. When used this way, the invention positions the food further away from the heat source in such a way that the heated flue from the grill's heat source contacts all of the food in a more even manner. This can be contrasted with placing the food directly on top of the upper grill rack of a typical cooking grill. The grill operator must frequently rotate the food to avoid over-cooking the side of the food facing the heat source. For food placed directly on the grill surface, if the grill operator does not carefully monitor the temperature and exposure time of the food to the heat source, burning and other forms of over-cooking occur. The invention disclosed herein solves this problem by positioning the food relative to the heat source in a manner that greatly reduces the effects of over-cooking. The device accomplishes this benefit by the repositioning the food in a more advantageous arrangement relative to the heat source and uses the conductive properties of metal to distribute heat energy through the food from the inside in addition to the external heat contact.

In the preferred practice of the invention, the device supports ten of the shaped tines in a vertical position above a grille surface. A single square base plate supports the tines and food and due to its weight, maintains the food in a stable, vertical orientation. Heat from the grill cooks the food by contact with the hot flue outside of the food and by conductive heat transfer through the inventions metal parts. The device of the present invention can be used with any conventional grill or even within an oven. The device is completely separate from the heat source and generally requires no modifications to most grills or ovens for operation, except for removal or repositioning of secondary grill grates.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DESCRIPTION OF THE PREFERRED EMBODIMENT

Figure 1:
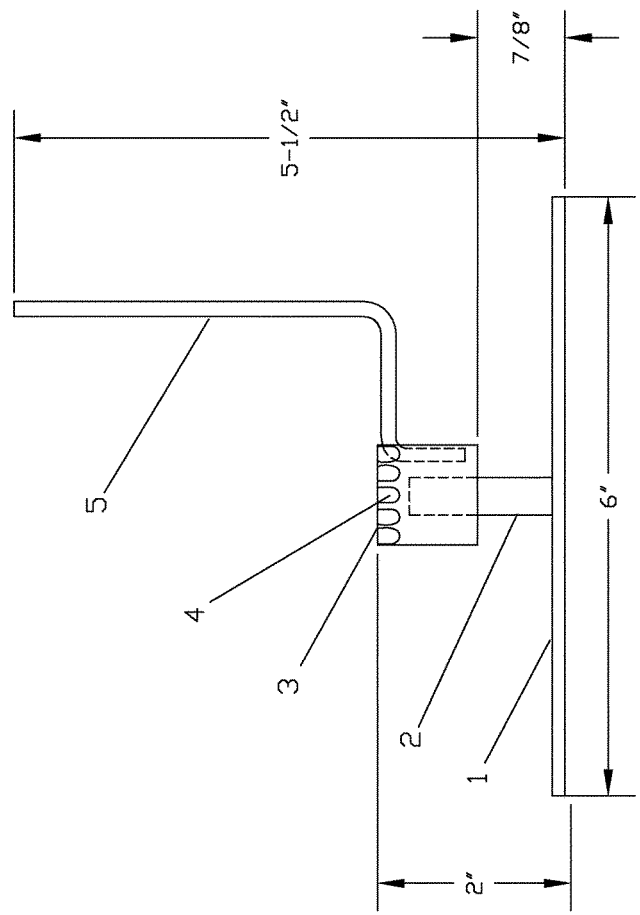
FIG. 1 shows a side view of the preferred embodiment with a single tine placed in one of the tine holder slots.

FIG. 1 is a side view of the preferred embodiment with only one food tine 5 placed in the tine holder 3 for illustration of the principle. In the preferred embodiment, up to 10 food tines would be used forming a circle of food about the base 1. One end of the food tine 5 is inserted into the tine holder 3 through a pre-drilled hole 4 in the tine holder 3. The food tines are made from a straight length of circular steel rod into which two 90° bends are placed. The first bend, or outer bend, establishes the straight length section where the food is placed. The second 90° bend, or inner bend, establishes the length of the tine anchor that is inserted into the tine holder 3 at hole 4. The second bend also establishes the overall diameter of the food circle about the axis of the baseplate 1. Some experimentation was necessary to determine the optimum locations of these bends as it relates to the type of food to be cooked, the available space above the cooking grate on most outdoor grills, and the balance of the device when loaded with food. In the preferred embodiment, the inventor chose to make the base plate 1 dimensions such that it could be used on a standard two-grate grill while still allowing grill space that could be used for conventional grilling (i.e., flat surface with heat source primarily only directed at down-facing surface of the food).

FIG. 1 also shows a baseplate 1 and a center anchor post 2 located in the center of the baseplate 1. In the preferred embodiment, this plate is square with dimensions of approximately 6 inches each side. This plate could also be circular but square may have certain advantages in the manufacturing process as steel plate comes in rectangular sheets. The center anchor post 2 is cut from steel rod, approximately 3/8 inch in diameter and approximately 1½ inches long in the preferred embodiment. The anchor post 2 is attached to the baseplate in a manner that is sturdy and durable, such as by welding. Sitting atop the anchor post is the tine holder 3. In FIG. 1, the dashed lines indicated structure that is present but normally hidden when viewing the device normally. FIG. 1 shows the tine holder 3 sitting atop the anchor post 2 with the top of the anchor post fitting inside a pre-drilled cavity inside the tine holder 3.

Figure 2:
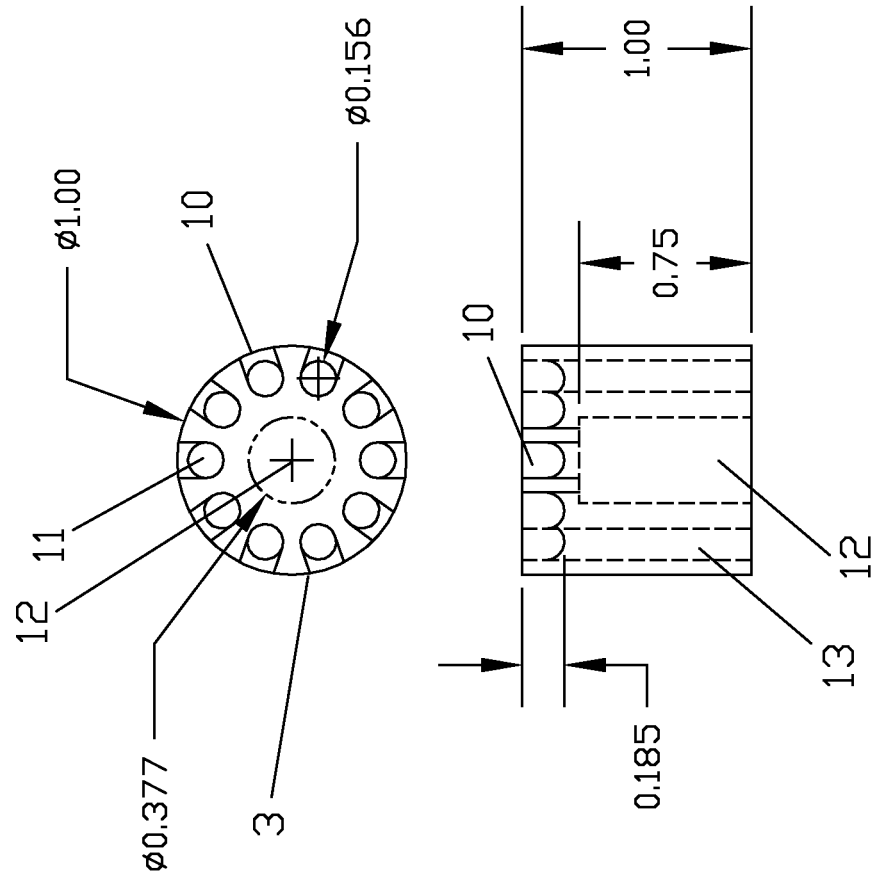
FIG. 2 shows a top and side view of the tine holder and the dimensions of the preferred embodiment.

In FIG. 2, additional details of the tine holder 3 are shown. This figure shows two views, one from the top and one from the side. In reference to the top view, the tine holder 3 is fabricated from a single piece of solid, circular steel rod that is machined to provide an anchor post hole 12. In the preferred embodiment, this anchor post hole 12 is 0.002 inch larger than the anchor post, so that the anchor post fits snuggly into the anchor post hole 12. In continued reference to the top view of the tine holder of FIG. 2, a plurality of circular tine holes 11 are spaced evenly around the axis of the tine holder. In the preferred embodiment, there are ten tine holes 11 and the tine hole diameter is 0.006" larger than the tine 5. This allows the tine 5 to readily pass into the tine holder 3 when assembling the device and readily fall out of the tine holder 3 when disassembling the device. In the preferred embodiment, the height of the tine holder 3 is approximately 1 inch in height and diameter. In reference to the vertical view of the tine holder 3 in FIG. 2, a tine notch 10 is machined out of the outer surface of tine holder, for approximately 0.185 inch in the preferred embodiment. When looking at the side of the tine holder, the notched section is u-shaped. This tine notch 10 further enhances the ability of the tine to be inserted into and removed from the tine holder 3. The u-shapes on the side also serve to keeps the tines-food combination evenly spaced and from allowing the times to close in toward one another. The notches also maintain spacing when device is rotated while cooking. Typically, one end of the tine is inserted in a substantially horizontal orientation, and then moved upward to a vertical position. By removing this portion of the tine holder, the tine has a larger inlet opening to be placed and readily slips into the tine holder slots 13.

Figure 3:
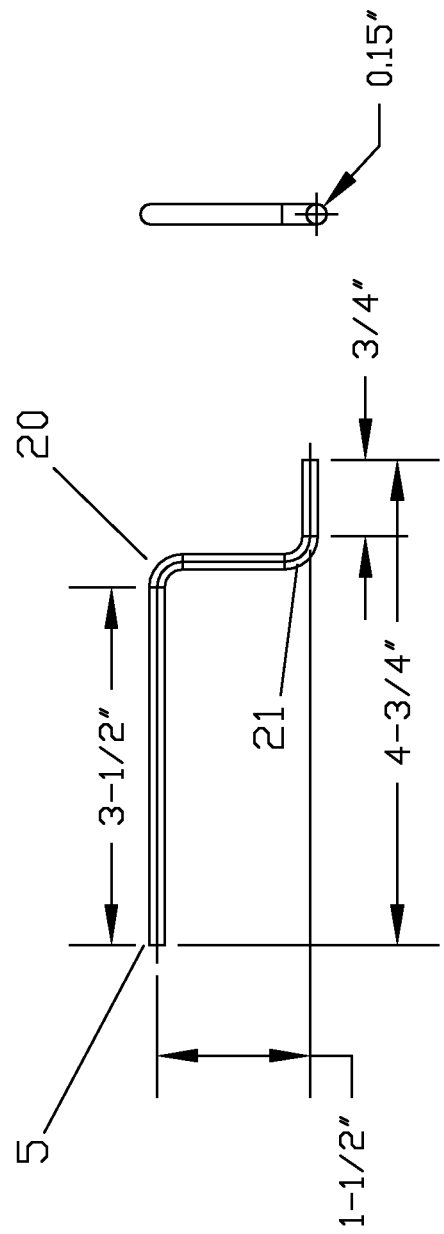
FIG. 3 shows a side view of one of the tines with dimensions of the preferred embodiment.

In reference to FIG. 3, a food tine 5 is shown in both a side view and an end view. In the side view of the preferred embodiment, food end of the tine is 3½ inches. The first 90° bend 20 creates a horizontal section of 1½ inches in length. The second 90° bend 21 creates a short vertical section of ¾ inch in length, which sits inside the tine holder 3. The end view of FIG. 3 shows the 0.15 inch diameter of the tine rod of the preferred embodiment.

Figure 4:
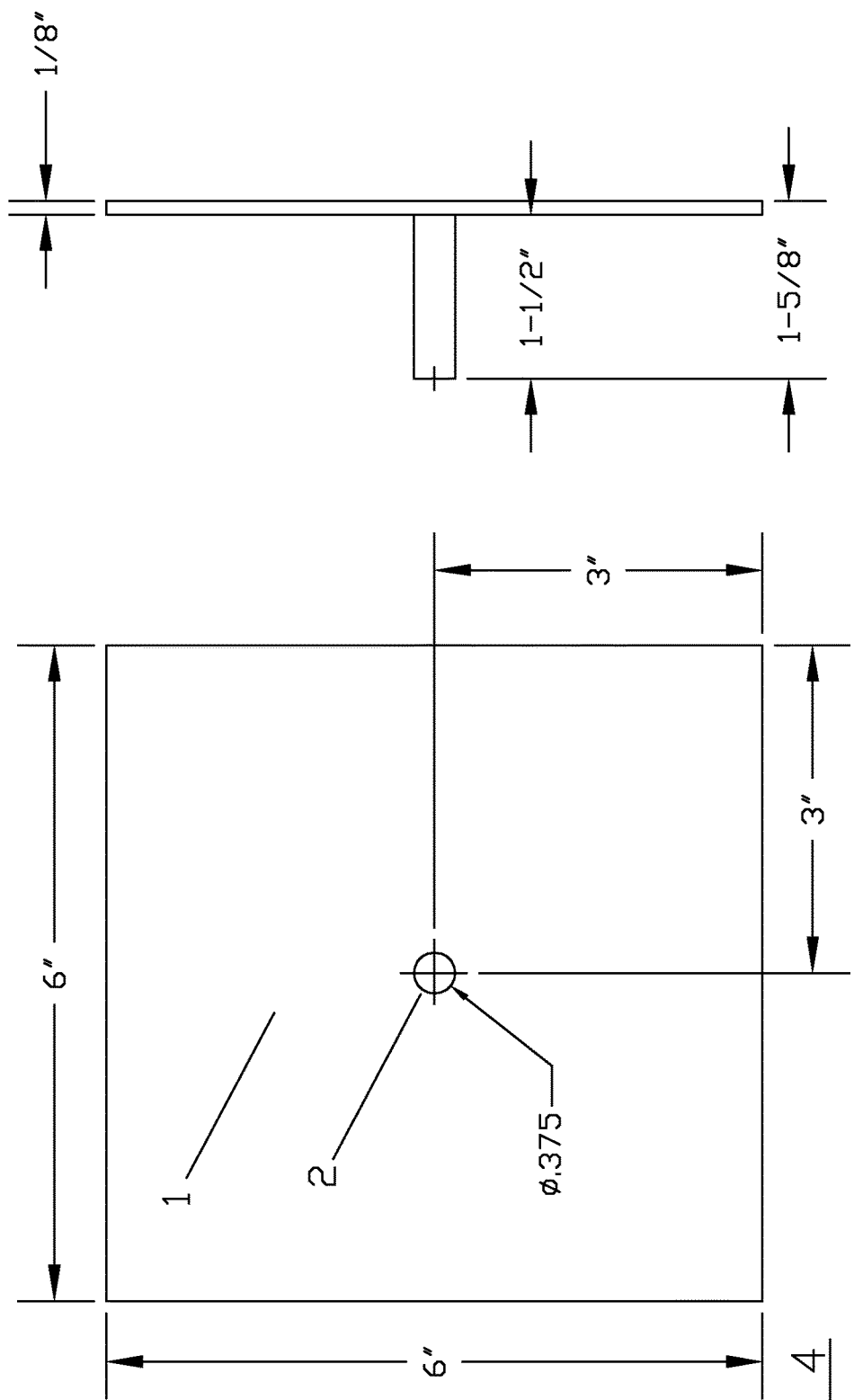
FIG. 4 shows a top view and a side view of the baseplate and the anchor post with dimensions of the preferred embodiment.

In reference to FIG. 4, a top view and a side view of the baseplate 1 of the preferred embodiment are presented. The top view shows a square baseplate 1 of 6 inches square. The anchor post 2 is shown in the center of the plate and is 3/8 inch diameter circular rod. In the side view, the baseplate 1 is shown fabricated out of 1/8 inch plate. The overall height of baseplate and anchor post 2 are 1 5/8 inches overall dimension. Heat from the heat source contacts the underside of the baseplate when it is placed on top of the grate of a typical grill. In addition to positioning the food in a manner less likely to burn the food by over-exposure to the heat source, the device allows heat absorbed into the baseplate to travel rapidly upward through the anchor post 2, the tine holder 3, the tine 5 and into the food due to the conductive properties of the steel of which the preferred embodiment is fabricated. In effect, the cooking is enhanced by applying heat more uniformly from the outside and from the inside.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed for Letters Patent is:

1. A cooking device for supporting food placed atop a heat source comprising:
    a metal base plate having an upper face, a lower face, and a central axis perpendicular to the upper and lower faces where said lower face is exposed to the heat source;
    a metal post located centrally to the base plate and projecting vertically upward from the upper face along the central axis; and
    a cylindrical metal rod holder placed atop the metal post having a central cavity on the bottom end for receiving the metal post and a plurality of cylindrical cavities equally spaced around a periphery of the top end for receiving and positioning a plurality of skewer rods on which the food being cooked is placed such that the food is presented in an orientation substantially parallel to the flow of radiant and convective energy from the heat source,
    wherein each skewer rod further comprises:
    a first straight section for piercing and supporting the food in a vertical orientation relative to the flow of heat from the heat source,
    a second straight section attached at a right angle to the first straight section that spaces the food a distance away from the central axis of the base plate, and
    a third straight section attached at a right angle to the second straight section that is inserted into the one of the equally spaced cavities the periphery of the cylindrical metal rod holder.

2. The device of claim 1 wherein a u-shaped opening of the metal rod holder at the top end of each of the cylindrical cavities provides a notch for receiving the second straight section of the metal rods such that the metal rods remain spaced apart and do not rotate toward one another when the device is moved whole the food is attached.

3. The device of claim 2, wherein the height of the u shaped notched section is from 0.1 to 0.25 inches in length, inclusive when measured from the base to the top of the notch section.

4. The device of claim 1, where the first straight section of the metal rods are from 2 to 6 inches in length, inclusive.

5. The device of claim 1, where the second straight section of the metal rods are from 1 to 4 inches, inclusive.

6. The device of claim 1, where the third straight section of the metal rods are from 0.5 to 2 inches, inclusive.

7. The device of claim 1, where the metal base plate is from ⅛ to ¼ inch thick, inclusive.

8. The device of claim 1, where the metal base plate is a square of having sides from 4 to 10 inches, inclusive.

9. The device of claim 2, where the cylindrical diameter of the rods is from 0.125 to 0.5 inch, inclusive.

10. The device of claim 1, where the base plate, the rod holder and the rods are fabricated from carbon steel, stainless steel, or aluminum.

* * * * *